US006738126B1

United States Patent
Chung et al.

(12) United States Patent
Chung et al.

(10) Patent No.: US 6,738,126 B1
(45) Date of Patent: May 18, 2004

(54) METHOD OF FABRICATING LIQUID CRYSTAL PANEL BY ARRANGING HIGH VISCOSITY LIQUID CRYSTAL ONTO A SUBSTRATE

(75) Inventors: In-Jea Chung, Kumi-shi (KR); In-Duk Song, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 190 days.

(21) Appl. No.: 09/717,068

(22) Filed: Nov. 22, 2000

(30) Foreign Application Priority Data

Nov. 26, 1999 (KR) .......................... 1999-53022

(51) Int. Cl.[7] .................... G02F 1/1339; C09K 19/02
(52) U.S. Cl. .................... 349/190; 349/153; 349/167
(58) Field of Search .................... 349/153, 167, 349/190, 189

(56) References Cited

U.S. PATENT DOCUMENTS

| 4,974,940 A | * | 12/1990 | Asano et al. ................ 349/101 |
| 5,247,377 A | * | 9/1993 | Omeis et al. ................. 359/76 |
| 5,348,685 A | * | 9/1994 | Mochizuki et al. .... 252/299.62 |
| 5,361,152 A | * | 11/1994 | Harada et al. ............... 349/188 |
| 5,511,591 A | * | 4/1996 | Abe .............................. 141/7 |
| 5,642,214 A | * | 6/1997 | Ishii et al. ..................... 349/96 |
| 5,742,370 A | * | 4/1998 | Kim et al. ................... 349/124 |
| 6,011,609 A | * | 1/2000 | Kato et al. ................... 349/190 |
| 6,016,178 A | * | 1/2000 | Kataoka et al. ............. 349/117 |
| 6,055,035 A | * | 4/2000 | von Gutfeld et al. ....... 349/187 |

FOREIGN PATENT DOCUMENTS

JP  59195222 A  * 11/1984  .......... G02F/1/133

OTHER PUBLICATIONS

Pohl et al., Physical Properties of Liquid Crystals, 1990, World Scientific Publishing, ed. Bahadur, vol. 1, pp. 161–162.*

* cited by examiner

*Primary Examiner*—Robert H. Kim
*Assistant Examiner*—Andrew Schechter
(74) *Attorney, Agent, or Firm*—McKenna Long & Aldridge LLP

(57) ABSTRACT

A liquid crystal display panel fabricating method includes forming a liquid crystal layer on a first substrate of the liquid crystal panel before attaching a second substrate to the first substrate. After attaching the second substrate to the first substrate having the liquid crystal layer, the liquid crystal layer is heat-treated so that the liquid crystal layer becomes activated.

20 Claims, 5 Drawing Sheets

METHOD OF FABRICATING LIQUID CRYSTAL PANEL BY ARRANGING HIGH VISCOSITY LIQUID CRYSTAL ONTO A SUBSTRATE

This application claims the benefit of Korean Patent Application No. 1999-53022, filed on Nov. 26, 1999, which is hereby incorporated by reference for all purposes as if fully set forth herein.

BACKGROUND OF THE INVENTION

1. Field of the Invention

The present invention relates to manufacturing liquid crystal display (LCD) devices, and more particularly, to a method for fabricating liquid crystal panels.

2. Discussion of the Related Art

A typical liquid crystal display (LCD) panel has upper and lower substrates and an interposed liquid crystal layer. The upper substrate usually includes common electrodes, while the lower substrate includes switching elements, such as thin film transistors (TFTs), and pixel electrodes.

As the present invention relates to manufacturing liquid crystal display panels, a brief explanation about conventional liquid crystal display manufacturing processes will be helpful. Common electrodes and pixel electrodes are formed on upper and lower substrates, respectively. A seal is then formed on the lower substrate. The upper and lower substrates are then bonded together using the seal such that the common electrodes of the upper substrate and the pixel electrodes of the lower substrate are opposed to each other, and liquid crystal cells are formed. Liquid crystal material is then injected into the cells through injection holes. The injection holes are then sealed. Finally, polarizing films are attached to the outer surfaces of the upper and lower substrates.

In operation, the light passing through the liquid crystal cells is controlled by electric fields that are applied via the pixel and common electrodes. By controlling the electric fields, desired characters or images can be displayed.

While fabricating the various components of a liquid crystal display, such as the thin film transistors or the color filters, typically requires require numerous manufacturing steps, the overall fabrication process is relatively straightforward. FIG. 1 illustrates a typical liquid crystal panel manufacturing process in some detail. An initial step, st1, forms an array of thin film transistors and pixel electrodes over an array or TFT (lower) substrate.

The next step, st2, forms an orientation film over the lower substrate. This involves uniformly depositing a polymer thin film over the lower substrate and then uniformly rubbing the polymer thin film with a fabric. The rubbing process involves rubbing the surface of the polymer thin film so as to orient or align the film. A typical orientation film is an organic thin film such as a polyimide thin film.

The third step, st3, produces a seal pattern on the lower substrate. When the upper and lower substrates are attached, the seal patterns form cell spaces that will receive the liquid crystal material. The seal pattern also prevents the interposed liquid crystal material from leaking out of the completed liquid crystal cell. A screen-print technology is conventionally used to fabricate the seal pattern using a thermosetting resin.

The fourth step, st4, sprays spacers over the lower substrate. The spacers have a definite size and act to maintain a precise and uniform space between the upper and the lower substrates. Accordingly, the spacers are placed with a uniform density on the lower substrate using either a wet spray method, in which case the spacers are mixed in an alcohol and then sprayed, or a dry spray method in which only the spacers are sprayed. The dry spray method itself is divided into a static electric spray method that uses static electricity and a non-electric spray method that uses gas pressure. Since static electricity can be harmful to the liquid crystal, the non-electric spray method is widely used.

The next step, st5, aligns and attaches the color filter substrate (upper substrate) and the TFT substrate (lower substrate) together. The aligning margin, which is less than a few micrometers, is important. If the upper and lower substrates are aligned and attached beyond the aligning margin, light leakage occurs to prevent a good display quality during the operation of the liquid crystal cell.

In the sixth step, st6, the liquid crystal element fabricated through the five steps is cut into individual liquid crystal cells. Conventionally, liquid crystal material was injected into the space between the upper and the lower substrates before the substrates were cut into individual liquid crystal cells. But, as displays become larger, the liquid crystal cells are usually cut first and then the liquid crystal material is injected. The process of cutting typically includes scribing using a diamond pen to form cutting lines on a substrate, and a breaking step that separates the substrate along the scribed lines.

The seventh step, st7, actually injects liquid crystal material into the individual liquid crystal cells. Since each individual liquid crystal cell is many hundred square centimeters in area, but has only a few micrometer gap between plates, a vacuum injection method is effectively and widely used. Generally, injecting the liquid crystal material into the cells takes the longest manufacturing time. Thus, for manufacturing efficiency, it is important to have optimum conditions for vacuum injection.

FIG. 2 shows a conventional vacuum injection process for injecting liquid crystal material into a liquid crystal cell. To inject the liquid crystal material, a liquid crystal cell 2 having an injection hole 4 is placed inside a vacuum apparatus 6. The liquid crystal cell is located over a vessel 8 that contains the liquid crystal material 10. During operation, suction removes air from the vacuum apparatus 6 to create a strong vacuum.

In practice, it is possible for small air bubbles in the liquid crystal material 10 to gradually add together to form a larger air bubble. Such air bubbles can causes problems. Accordingly, before injection, the liquid crystal material should be left under a vacuum of a few mTorr for a sufficient time so that the air bubbles in the liquid crystal material 10 are removed. Conventionally, the vessel 8 containing the liquid crystal material 10 and the liquid crystal cell 2 are all left under this vacuum condition.

One method of injecting the liquid crystal material into a liquid crystal cell is to dip the liquid crystal cell into the tray containing the liquid crystal material. However, the dipping method consumes too much of the liquid crystal material. Another method involves touching (slightly dipping) only the injection hole 4 to the liquid crystal material. Still referring to FIG. 2, in the touch method, after air in the liquid crystal cell 2 and in the liquid crystal material 10 has been removed, the injection hole 4 is slightly dipped into the vessel 8 containing the liquid crystal material 10. At first, the liquid crystal material 10 is injected into the liquid crystal cell 2 by capillary forces. Later, nitrogen gas is introduced into the vacuum apparatus 6. The difference in pressure between the interior and exterior of the liquid crystal cell 2 forces liquid crystal material 10 into the liquid crystal cell 2.

FIG. 3 is a graph illustrating the pressure in the vacuum apparatus 2 with respect to time. During period "A", a vacuum condition is being formed. At the end of period "A" the injection hole 4 is dipped into the vessel 8 containing the liquid crystal material 10. During period "B", the liquid crystal molecules are pressure injected into the liquid crystal cell. After the injection of the liquid crystal material is complete, the injection hole 4 is sealed with an epoxy-based sealant that is applied through a dispenser.

However, for large size panels (such as greater than 20-inch panels including a 30 or 40-inch panel), liquid crystal injection using the above-described injection method takes too much time. Moreover, it is difficult to maintain the cell gap during the injection.

SUMMARY OF THE INVENTION

Accordingly, the present invention is directed to a liquid crystal display panel fabricating method that substantially obviates one or more of the problems due to limitations and disadvantages of the related art.

An object of the present invention is to increase the fabricating rate and yield of the liquid crystal display panel.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

The present invention provides for a fabricating method for a liquid crystal display panel, which includes first and second substrates and an interposed liquid crystal layer, the second substrate including common electrodes, and the first substrate including switching elements, such as thin film transistors (TFTs), and pixel electrodes, the fabricating method comprising: preparing the first and second substrates; depositing first and second orientation film, respectively, on the first and second substrates; depositing a liquid crystal material on the first orientation film of the first substrate; forming a seal material on edges of the first substrate; and attaching the first and second substrates.

In the fabricating method, before depositing the liquid crystal material, each of the first and second orientation films is rubbed in a proper direction. The fabricating method further includes heat-treating the liquid crystal material after attaching the first and second substrates.

In another aspect of the present invention, a fabricating method for a liquid crystal display panel having first and second substrates and an interposed liquid crystal layer comprises providing the first and second substrates; forming first and second orientation films on the first and second substrates, respectively; depositing a liquid crystal material on the first orientation film of the first substrate, the liquid crystal material having a viscosity of greater than 100 mm$^2$/sec; forming a seal material at edges of the first substrate; attaching the first and second substrates; and heat-treating the liquid crystal material to activate the liquid crystal and have substantially the same characteristics as a liquid crystal material having a viscosity of 20 to 50 mm$^2$/sec.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the invention and together with the description serve to illustrate the principles of the invention.

In the drawings.

DETAILED DESCRIPTION OF AN ILLUSTRATED EMBODIMENT

Reference will now be made in detail to an embodiment of the present invention, which is illustrated in the accompanying drawings.

Figure 1:
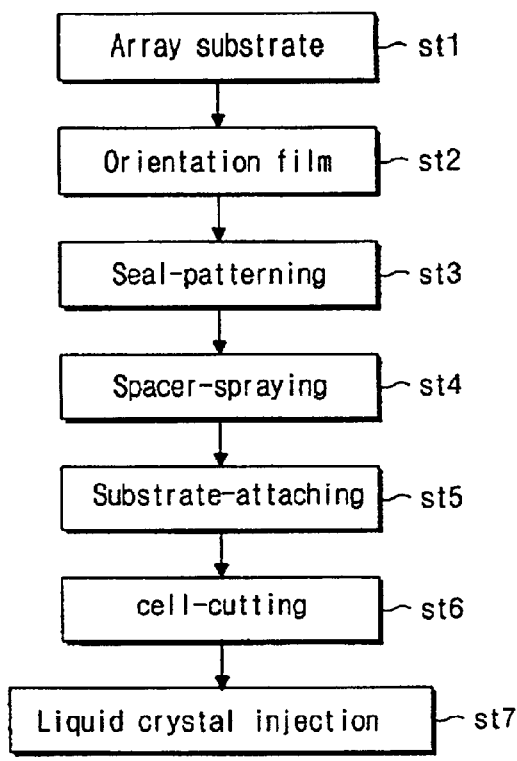
FIG. 1 is a block diagram illustrating a typical manufacturing process for a liquid crystal cell.
Figure 2:
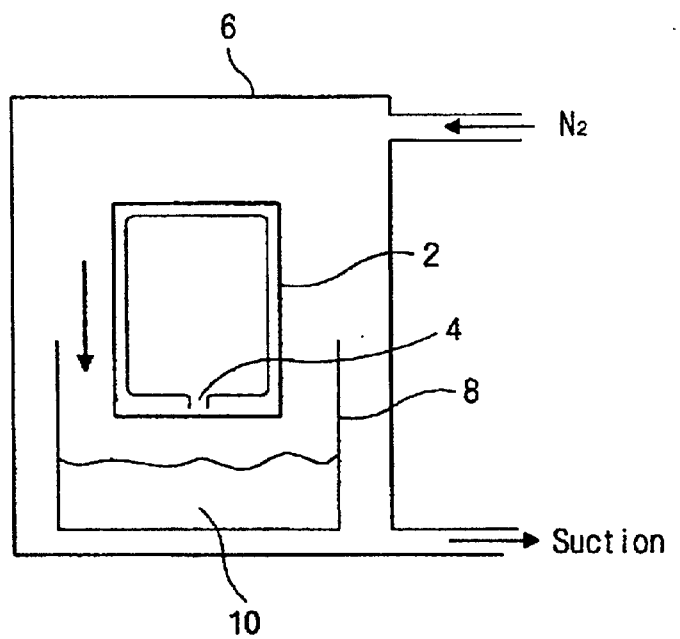
FIG. 2 illustrates a typical vacuum injection apparatus.
Figure 3:
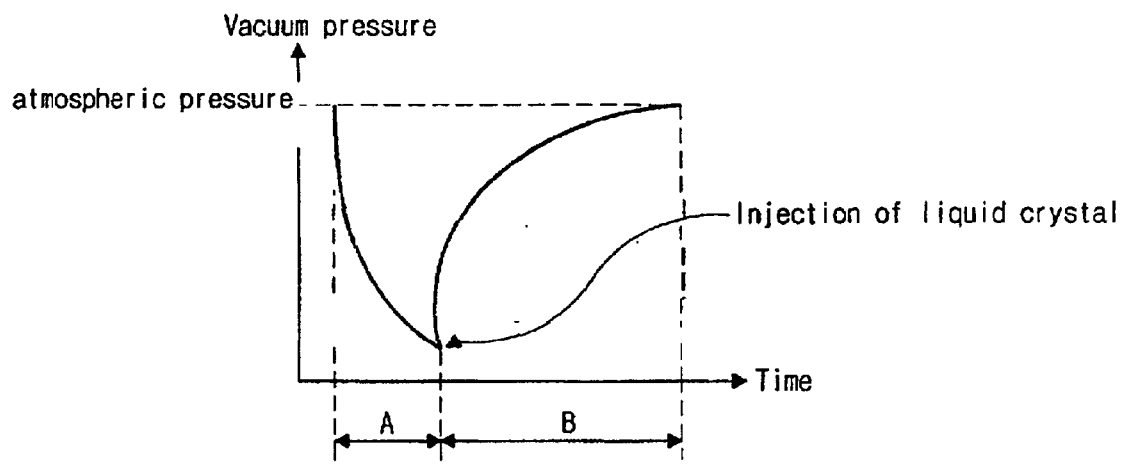
FIG. 3 is a graph of vacuum pressure verses injection time when injecting liquid crystal material into a liquid crystal cell.
Figure 4A:
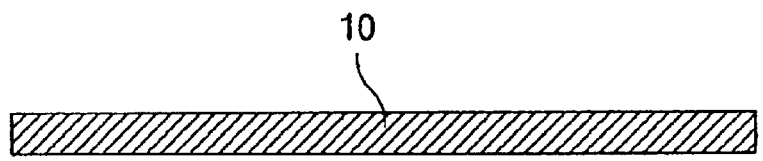
FIGS. 4A to 4E illustrate a method of making a liquid crystal display panel using a roller-printing technique, according to a preferred embodiment of the present invention.
Figure 4B:
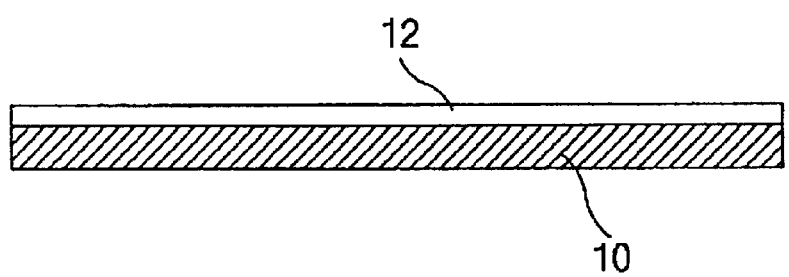

FIGS. 4A to 4E illustrate the principles of the present invention. At first, as shown in FIGS. 4A to 4B, a lower substrate 10 is prepared, and, on an upper surface of the lower substrate 10, a first orientation film 12 is deposited. The first orientation film 12 is preferably made of a polyimide (PI). The first orientation film 12 is then rubbed by a fabric to have a first orientational property.

Figure 4C:
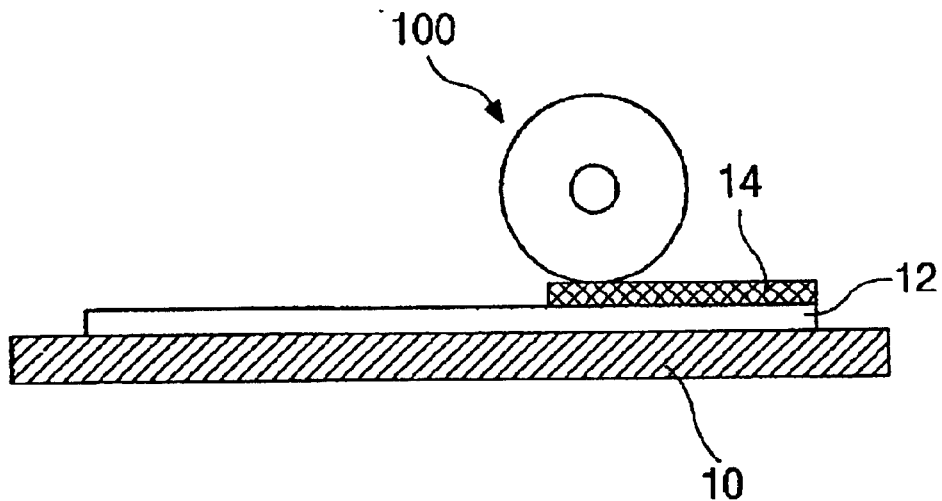

Thereafter, as shown in FIG. 4C, a liquid crystal 14 is printed on the first orientation film 12 by a roller 100. The liquid crystal 14 preferably has a viscosity above 100 mm$^2$/sec, which is higher than that of a conventional liquid crystal injected via the conventional vacuum injection method. The conventional liquid crystal has a viscosity of 20 to 50 mm$^2$/sec.

Figure 4D:
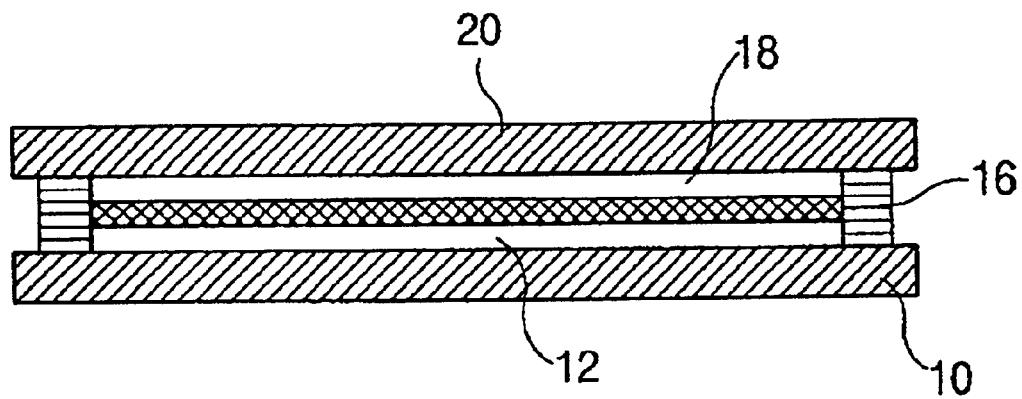

Next, as shown in FIG. 4D, a seal pattern 16 is formed at the edges of the lower substrate 10 to prevent leakage of the liquid crystal 14.

Figure 4E:
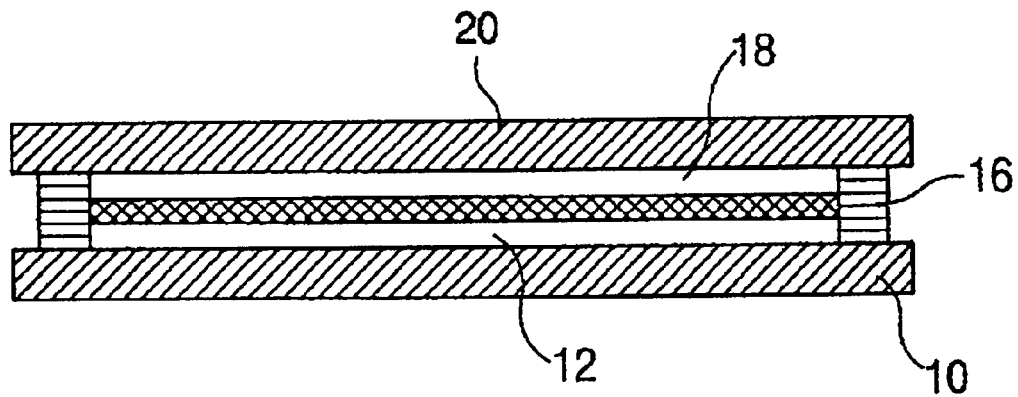

Finally, as shown in FIG. 4E, an upper substrate 20 having a second orientation film 18 is attached to the lower substrate 10 via the seal pattern 16 so that the first and second orientation films 12 and 18 face each other. After the attachment, the liquid crystal 14 is heat-treated under a proper temperature, and becomes activated to have the same characteristics as the typical liquid crystal.

Figure 5:
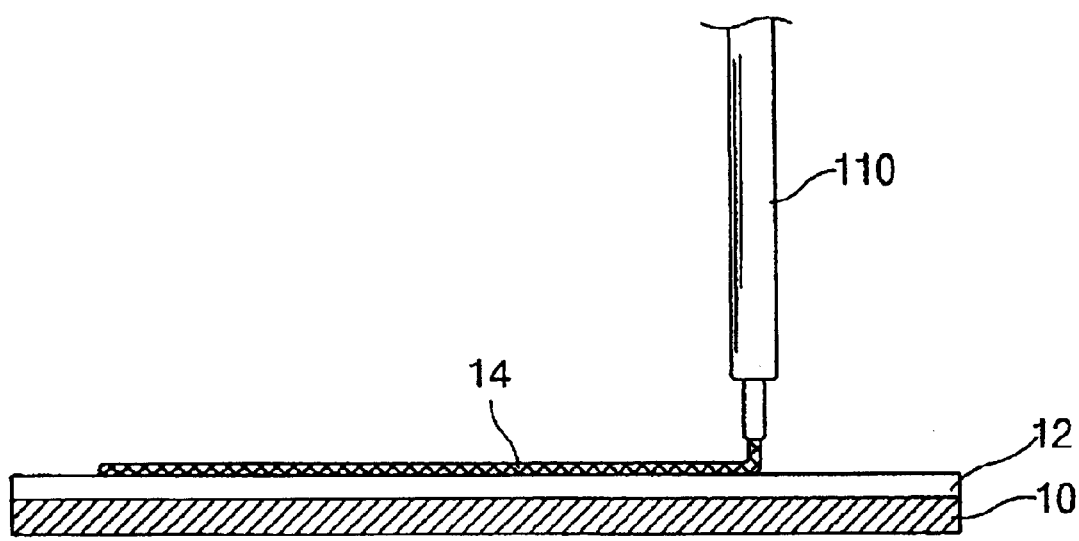
FIG. 5 illustrates a method of forming a liquid crystal by a dispenser, according to the preferred embodiment of the present invention.
Figure 6:
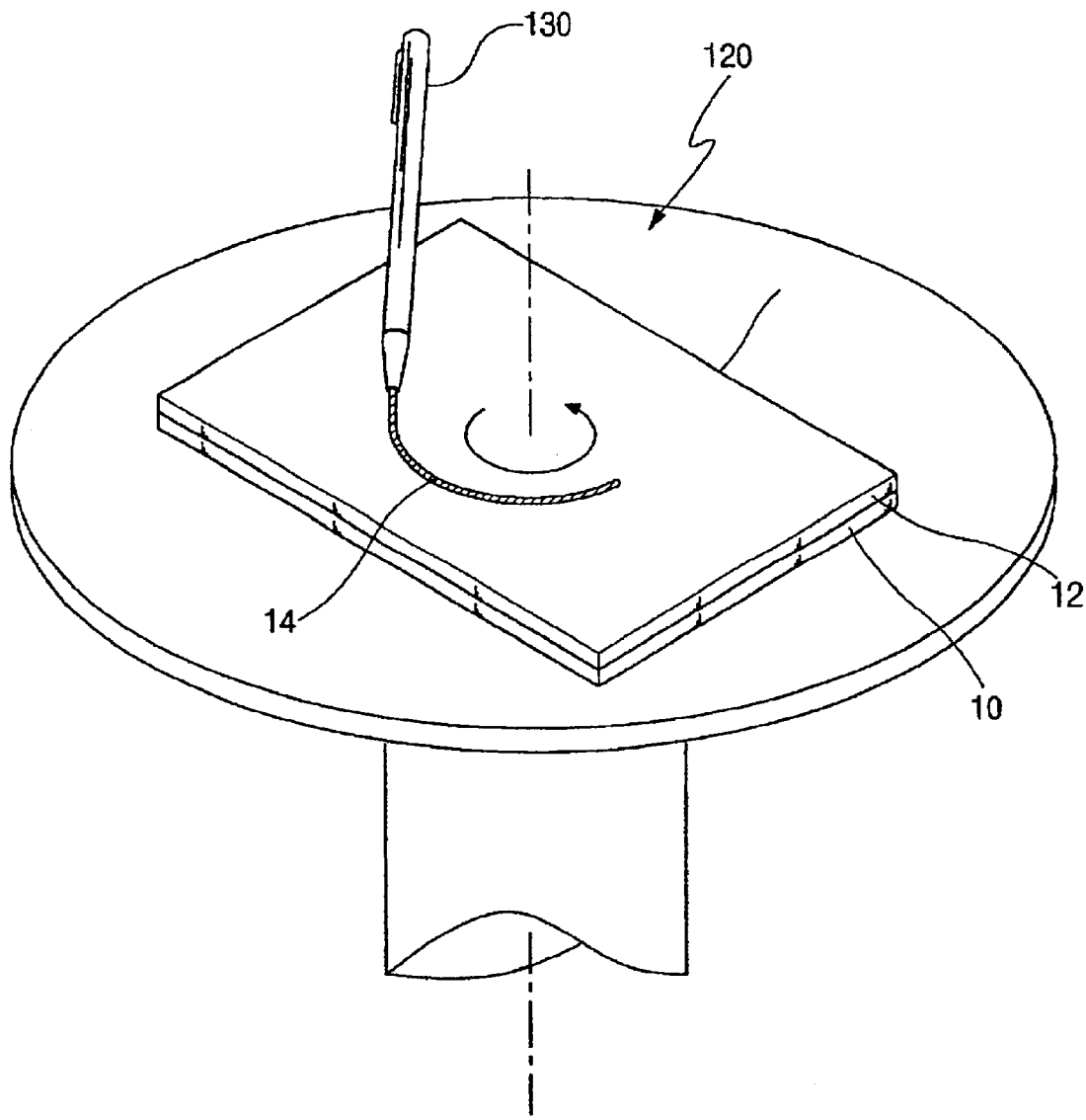
FIG. 6 illustrates a method of forming a liquid crystal by a spin-coating technique, according to the preferred embodiment of the present invention.

Instead of the above-mentioned roller-printing technique, a dispenser injection method as shown in FIG. 5 or a spin-coating method as shown in FIG. 6 can be preferably employed for the printing of the liquid crystal 14.

As shown in FIG. 5, a dispenser 110 is used for printing the liquid crystal 14 on the first orientation film 12. The dispenser 10 repeatedly moves over the orientation film 12 while the dispenser 110 injects the liquid crystal 14 on the first orientation film 12. The movement of the dispenser 110 is controlled by a preset program such that the liquid crystal 14 can be printed uniformly on the first orientation film 12.

In FIG. 6, a spin-coating machine 120 and a nozzle 130 are used for printing the liquid crystal 14 on the first orientation film 12. In particular, while the spin-coating machine rotates the lower substrate 10 continuously, the nozzle 130 injects or deposits the liquid crystal 14 on the first orientation film 12. The liquid crystal 14 is uniformly printed on the first orientation film due to a centrifugal force resulting from the rotation of the lower substrate 10 including the first orientation film 12.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A fabricating method for a liquid crystal display panel comprising:

providing first and second substrates;

forming first and second orientation films on the first and second substrates, respectively;

depositing a liquid crystal material on the first orientation film of the substrate, wherein the deposited liquid crystal material has a viscosity greater than about 20 to 50 mm$^2$/sec;

forming a seal material at edges of the first substrate after depositing the liquid crystal material; and attaching the first and second substrates.

2. The fabricating method according to claim 1, further comprising rubbing each of the first and second orientation films before depositing the liquid crystal material.

3. The fabricating method according to claim 1, further comprising heat-treating the liquid crystal material after attaching the first and second substrates.

4. The fabricating method according to claim 1, wherein the liquid crystal material is printed on the first orientation film by a roller.

5. The fabricating method according to claim 1, wherein the liquid crystal material has a viscosity of greater than 100 mm2/sec.

6. The fabricating method according to claim 5, wherein the liquid crystal material becomes activated to have substantially the same characteristics as a liquid crystal material having a viscosity of 20 to 50 mm2/sec.

7. The fabricating method according to claim 1, wherein the liquid crystal material is printed on the first orientation film using a dispenser.

8. The fabricating method according to claim 7, wherein the dispenser repeatedly moves over the first orientation film while the dispenser injects the liquid crystal material on the first orientation film.

9. The fabricating method according to claim 8, wherein the movement of the dispenser is controlled by a preset program for a uniform printing of the liquid crystal material.

10. The fabricating method according to claim 1, wherein the liquid crystal material is printed on the first orientation film using spin-coating.

11. The fabricating method according to claim 10, wherein the liquid crystal material is uniformly injected on the first orientation film as the first orientation film is rotated continuously to form a centrifugal force.

12. A fabricating method for a liquid crystal display panel, the liquid crystal display panel having first and second substrates and an interposed liquid crystal layer, the method comprising:

providing the first and second substrates;

forming first and second orientation films on the first and second substrates, respectively;

depositing a liquid crystal material on the first orientation film of the first substrate, the liquid crystal material having a viscosity of greater than 100 mm$^2$/sec;

forming a seal material at edges of the first substrate after depositing the liquid crystal material;

attaching the first and second substrates; and heat-treating the liquid crystal material to activate the liquid crystal and have substantially the same characteristics as a liquid crystal material having a viscosity of 20 to 50 mm$^2$/sec.

13. The fabricating method according to claim 12, further comprising rubbing each of the first and second orientation films before depositing the liquid crystal material.

14. The fabricating method according to claim 12, wherein the liquid crystal material is printed on the first orientation film by a roller.

15. The fabricating method according to claim 12, wherein the liquid crystal material is printed on the first orientation film using a dispenser.

16. The fabricating method according to claim 15, wherein the dispenser repeatedly moves over the first orientation film while the dispenser injects the liquid crystal material on the first orientation film.

17. The fabricating method according to claim 16, wherein the movement of the dispenser is controlled by a preset program for a uniform printing of the liquid crystal material.

18. The fabricating method according to claim 12, wherein the liquid crystal material is printed on the first orientation film using spin-coating.

19. The fabricating method according to claim 18, wherein the liquid crystal material is uniformly injected on the first orientation film as the first orientation film is rotated continuously to form a centrifugal force.

20. A fabricating method for a liquid crystal display panel comprising:

providing first and second substrates;

forming first and second orientation films on the first and second substrates, respectively;

rubbing each of the first and second orientation films;

depositing a liquid crystal material on the first orientation film of the substrate, the liquid crystal material having a viscosity greater than 100 mm$^2$/sec;

forming a seal material at edges of the first substrate after depositing the liquid crystal material;

attaching the first and second substrates; and heat-treating the liquid crystal material to activate the liquid crystal and have substantially the same characteristics as a liquid crystal material having a viscosity of 20 to 50 mm$^2$/sec.

* * * * *